United States Patent
Jadidi et al.

(10) Patent No.: US 11,017,023 B2
(45) Date of Patent: May 25, 2021

(54) DYNAMIC MEDIA RENDERING

(71) Applicant: Apple Inc., Cupertino, CA (US)

(72) Inventors: Amir H. Jadidi, San Jose, CA (US); Nicholas T. Verburg, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 367 days.

(21) Appl. No.: 15/462,764

(22) Filed: Mar. 17, 2017

(65) Prior Publication Data

US 2018/0268057 A1  Sep. 20, 2018

(51) Int. Cl.
*G06F 16/71* (2019.01)
*G06F 16/11* (2019.01)
*G06F 40/205* (2020.01)

(52) U.S. Cl.
CPC .......... *G06F 16/71* (2019.01); *G06F 16/113* (2019.01); *G06F 40/205* (2020.01)

(58) Field of Classification Search
None
See application file for complete search history.

(56) References Cited

U.S. PATENT DOCUMENTS

| | | | |
|---|---|---|---|
| 8,032,649 B2 | 10/2011 | Gupta et al. | |
| 8,910,032 B2* | 12/2014 | Graves | G11B 27/034 |
| | | | 715/201 |
| 8,984,569 B2* | 3/2015 | Hurst | H04N 21/47217 |
| | | | 725/87 |
| 9,264,752 B1 | 2/2016 | Hundemer | |
| 9,448,789 B2 | 9/2016 | Mathur et al. | |
| 9,652,774 B2* | 5/2017 | Cappio | G06Q 30/02 |
| 9,733,819 B2* | 8/2017 | Johnson | G06F 3/0485 |
| 9,992,533 B2* | 6/2018 | Lee | H04N 21/2353 |
| 10,803,474 B2* | 10/2020 | Rao | H04L 67/34 |
| 10,805,111 B2* | 10/2020 | McCue | H04L 67/10 |
| 10,834,161 B2* | 11/2020 | Gabin | H04L 65/605 |
| 10,877,644 B2* | 12/2020 | Hughes | H04N 21/8586 |
| 2008/0016245 A1 | 1/2008 | Cunningham et al. | |

* cited by examiner

*Primary Examiner* — Kim T Nguyen
(74) *Attorney, Agent, or Firm* — Fish & Richardson P.C.

(57) ABSTRACT

Systems, methods, devices and non-transitory, computer-readable storage mediums are disclosed for dynamic media rendering (DMR). In a first stage, a master media file is parsed into its component media assets, which are rendered individually into files and archived for reuse. In a second stage, the master media file is divided into segments containing sequential full-frames of media assets that are rendered into files and archived for reuse. Each time a media asset included in the master media file is updated, added or deleted, the one or more segment files that have a dependency on the updated, added or deleted media asset are rendered again. In a third stage, a third rendering node with knowledge of all the segment files archived during the second stage, and their respective order in time, combines the archived segment files together to create a full-frame, full-duration rendered master media file.

16 Claims, 8 Drawing Sheets

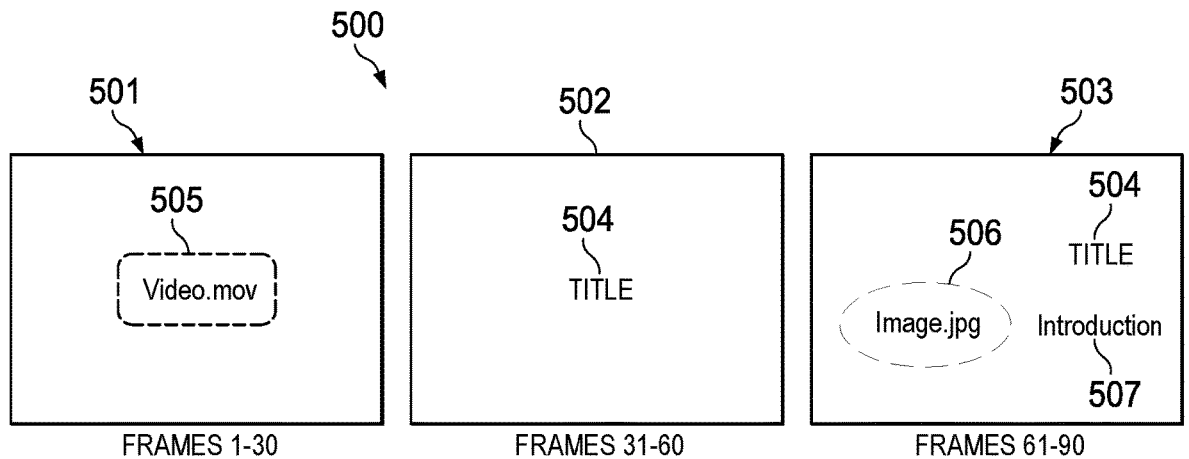
FIG. 5A
NOTHING NEW TO RENDER!
FIG. 5B
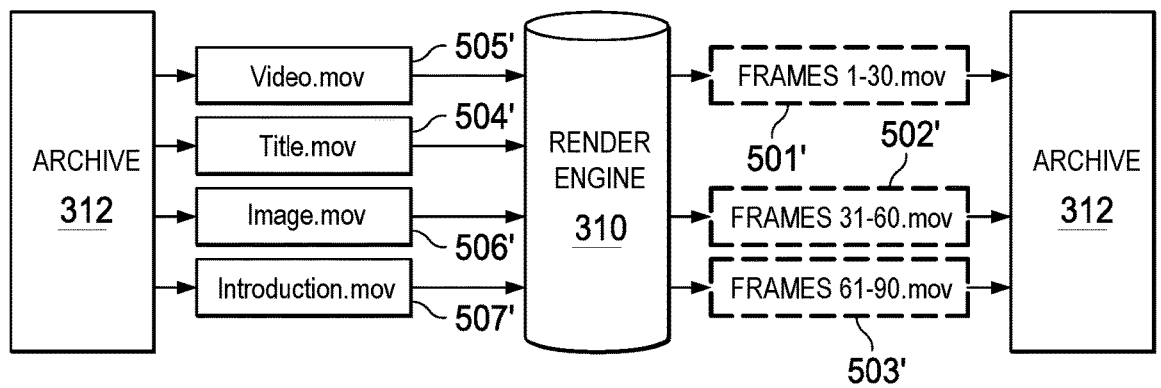
FIG. 5C
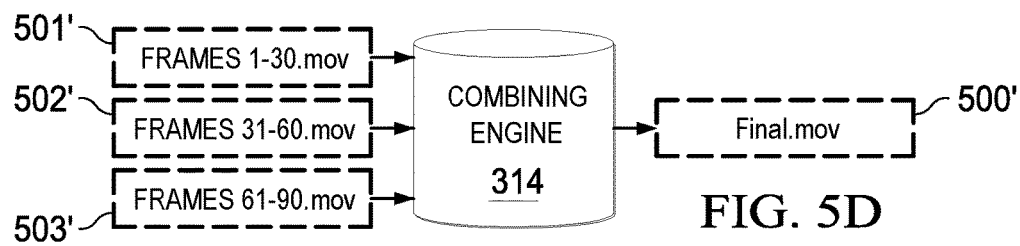
FIG. 5D

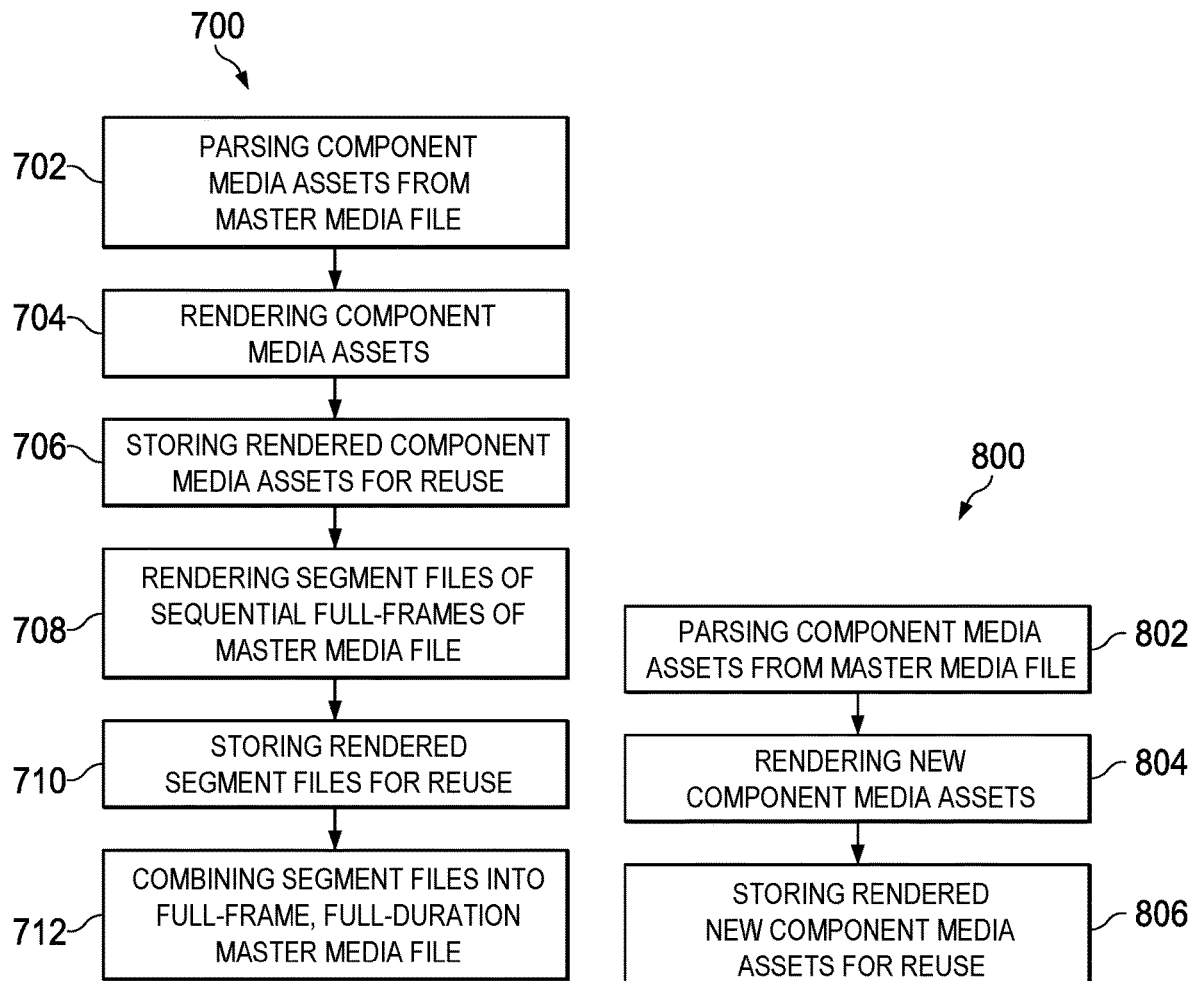

US 11,017,023 B2

DYNAMIC MEDIA RENDERING

TECHNICAL FIELD

This disclosure relates generally to rendering media files, such as motion graphics video files.

BACKGROUND

Rendering media files (e.g., video files) is a time and resource intensive process. For a video file with high resolution (e.g., 4K+), the rendering process can take many hours of computing resources to complete. This problem is more pronounced when only a small portion of content in a large media file is updated, as is often the case in motion graphics videos. For example, even when the updated content only appears in a small area of a frame of video, or when the updated content only appears during a portion of the video, the entire video file is rendered again. To improve the speed of the rendering process more computing resources can be added. Adding more computing resources, however, can be expensive and creates overhead and complexity each time the rendering system is scaled.

SUMMARY

Systems, methods, devices and non-transitory, computer-readable storage mediums are disclosed for dynamic media rendering (DMR).

In an embodiment, a method comprises: parsing, by one or more media rendering computers, a master media file into component media assets; determining, by the one or more media rendering computers, that one or more component media assets have not been previously rendered and stored in an archive; individually rendering, by the one or more media rendering computers, the one or more component media assets into rendered media asset files; storing, by the one or more media rendering computers, the rendered media asset files in the archive; determining, by the one or more media rendering computers, one or more archived segment files having dependencies on the one or more component media assets, each segment file including one or more full-frames of the master media file; individually rendering, by the one or more media rendering computers, the one or more segment files having dependencies on the one or more component media assets; storing, by the one or more media rendering computers, the rendered segment files; and combining, by the one or more media rendering computers, the rendered segment files together with other archived segment files of the master media file to create a full-frame, full-duration master media file.

In an embodiment, a method comprises: parsing, by one or more media rendering computers, a master media file into component media assets; individually rendering, by the one or more media rendering computers, the one or more component media assets into rendered media asset files; storing, by the one or more media rendering computers, the rendered media asset files in an archive; dividing, by the one or more media rendering computers, the master media file into a plurality of full-frame segment files, each segment file including a specified number of full-frames of the master media file, and at least one segment file including at least one frame including at least one archived component media asset; and storing, by the one or more media rendering computers, the plurality of full-frame segment files in the archive.

In an embodiment, a system comprises: one or more processors; memory coupled to the one or more processors and configured for storing instructions, which, when executed by the one or more processors, causes the one or more processors to perform operations comprising: parsing a master media file into component media assets; determining that one or more component media assets have not been previously rendered and stored in an archive; individually rendering the one or more component media assets into rendered media asset files; storing the rendered media asset files in the archive; determining one or more archived segment files having dependencies on the one or more component media assets, each segment file including one or more full-frames of the master media file; individually rendering the one or more segment files having dependencies on the one or more component media assets; storing the rendered segment files; and combining the rendered segment files together with other archived segment files of the master media file to create a full-frame, full-duration master media file.

In an embodiment, a non-transitory, computer-readable storage medium includes instructions, which, when executed by one or more processors, causes the one or more processors to perform operations comprising: parsing a master media file into component media assets; determining that one or more component media assets have not been previously rendered and stored in an archive; individually rendering the one or more component media assets into rendered media asset files; storing the rendered media asset files in the archive; determining one or more archived segment files having dependencies on the one or more component media assets, each segment file including one or more full-frames of the master media file; individually rendering the one or more segment files having dependencies on the one or more component media assets; storing the rendered segment files; and combining the rendered segment files together with other archived segment files of the master media file to create a full-frame, full-duration master media file.

Particular implementations disclosed herein provide one or more of the following advantages. DMR advantageously speeds up master media file rendering by performing the rendering process in three stages. In a first stage, the master media file is parsed into its component media assets, which are rendered individually into files (one media asset per file) and archived. In a second stage, the master media file is divided into segment files (one segment per file) containing sequential full-frames of media assets that are rendered and archived. Each time a media asset included in the master media file is updated, added or deleted, the one or more segment files that have a dependency on the updated, added or deleted media asset are rendered again. In a third stage, a third rendering node with knowledge of all the segment files archived during the second stage, and their respective order in time, combines the archived segment files together to create a full-frame, full-duration rendered master media file that can be distributed to one or more client devices.

An important advantage of DMR is reusability of component media assets and segment files. The component media assets rendered in the first stage are archived and can be referenced in the second stage each time they are needed for rendering a segment file. This is advantageous if, for example, a video producer is producing multiple video files from a single master media file, where only some of the individual media assets in the multiple video files are updated. For example, a movie trailer can have its title localized for every geographic location where it will be shown with no other updates to the video. The video may be 300 frames in length and the localized title may only be displayed for 30 of the 300 frames. The DMR system will reuse the individually rendered component media asset files archived during the first DMR stage, together with unaffected segment files rendered in the second stage. The DMR system will re-render only those segment files that are dependent on the updated, added or deleted component media assets. Finally, the DMR system will combine all the rendered segment files together to create the full-frame, full-duration master media file. Depending on the changes made from video to video, DMR can save as much as 99% of a rendering farm's computing resources for each subsequent video produced. The fewer the changes to the video, the more computing resources saved during the rendering process.

Another advantage of DMR is scalability. By breaking the master media file rendering process into three stages, a video producer is no longer dependent on using high performance rendering nodes. Instead, the video producer can rely on a micro service architecture that scales more easily.

Another advantage of DMR is robustness. Since the master media file is divided into segment files (one segment per file), if some segment files become corrupted, or a rendering node becomes inoperable, the unaffected segments can still be reused by the DMR system.

The details of the disclosed implementations are set forth in the accompanying drawings and the description below. Other features, objects and advantages are apparent from the description, drawings and claims.

DESCRIPTION OF DRAWINGS

FIGS. 5A-5D illustrate rendering a new master media file using only archived component media asset and segment files, according to an embodiment.

FIG. 7 is a flow diagram of a DMR process for rendering new master media files, according to an embodiment.

FIG. 8 is a flow diagram of a DMR process for updating master media files, according to an embodiment.

The same reference symbol used in various drawings indicates like elements.

DETAILED DESCRIPTION

Example DMR System

Figure 1:
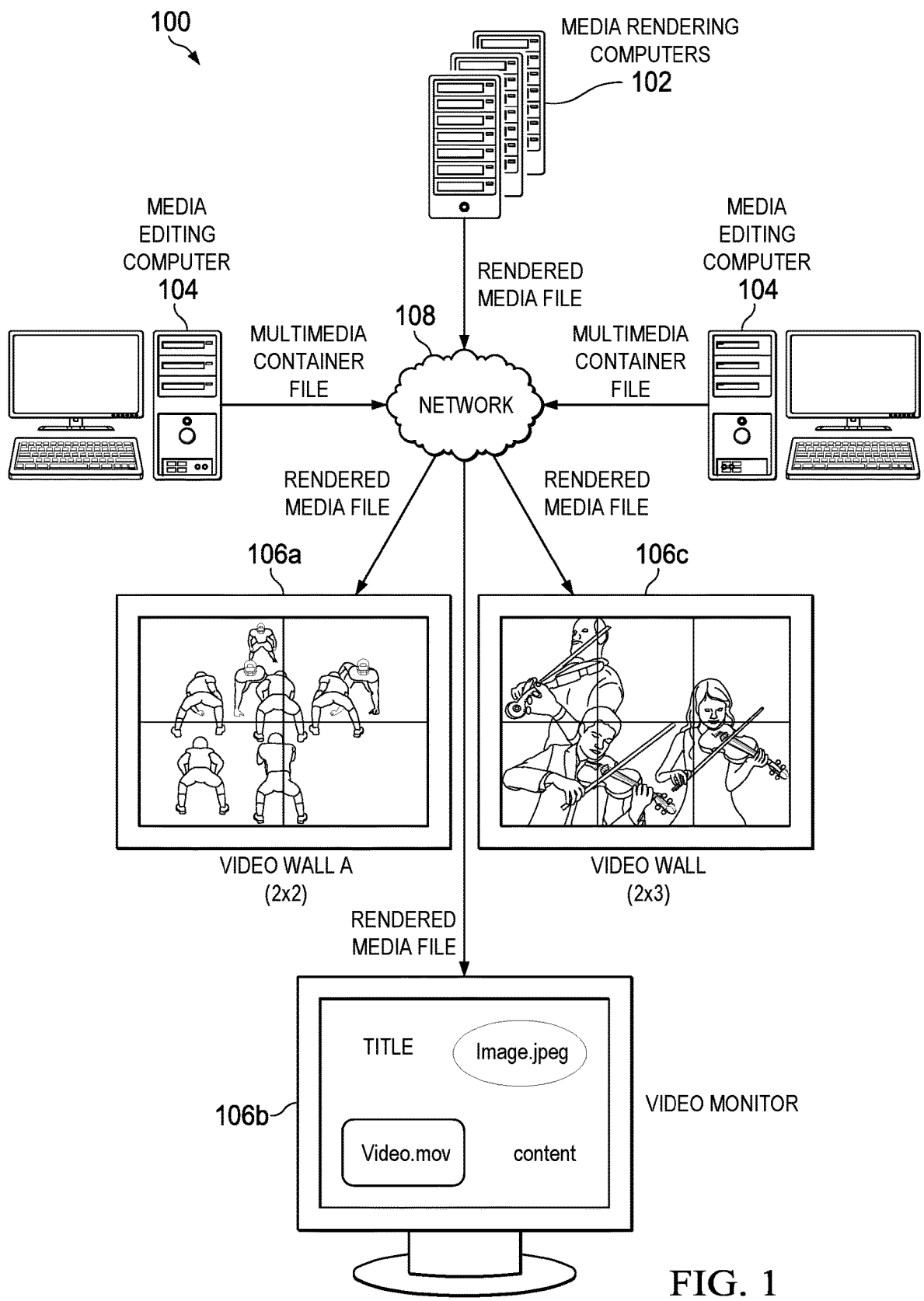
FIG. 1 illustrates a DMR system, according to an embodiment.

FIG. 1 illustrates a DMR system, according to an embodiment. DMR system 100 includes one or more media rendering computers 102, one or more media editing computers 104 and one or more client devices 106a-106c. Each of the client devices 106a-106c can be wired, or wirelessly coupled, to network 108.

Figure 2:
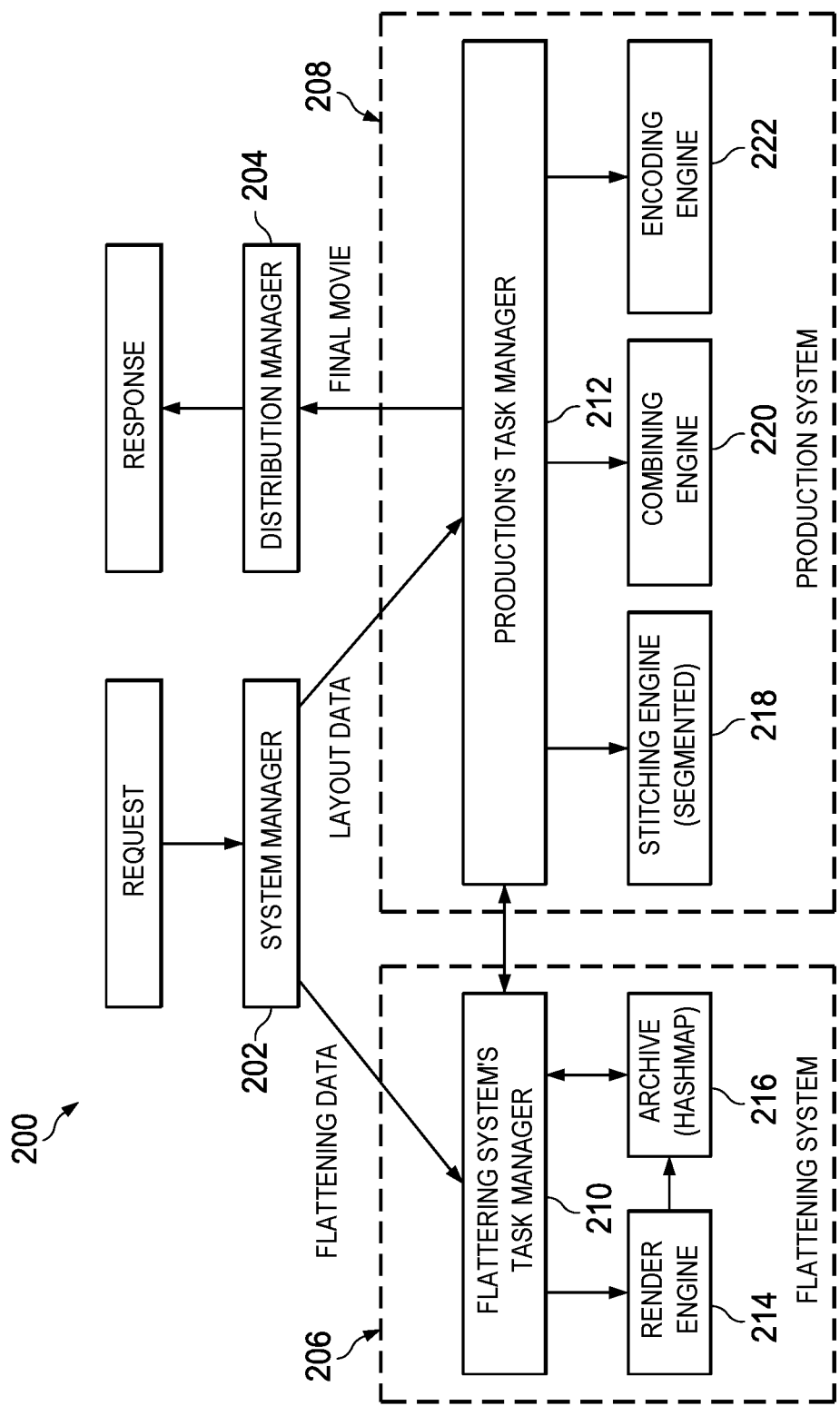
FIG. 2 illustrates DMR parallel processing system, according to an embodiment.

Media rendering computers 102 can be a plurality of server computers in a server farm configured to operate in a parallel processing system, as described in reference to FIG. 2. Media rendering computers 102 can include hardware (e.g., graphics processing units) and software for rendering all or portions of a master media file.

Media editing computers 104 can be any computing device capable of running media editing applications, including desktop computers and mobile devices (e.g., notebook computers, tablet computers, smartphones, wearable devices).

Client devices 106a-106c can include any device capable of playing a media file. In the example shown, client devices 106a, 106c are video walls that include multiple computer monitors, video projectors, or television sets tiled together contiguously or overlapped in order to form one large display screen. Client device 106a is a 2×2 video wall and client device 106c is a 2×3 video wall. Client 106b is a single display screen (e.g. a television screen or computer monitor). Some example technologies used for the display screens include but are not limited to: Liquid Crystal Display (LCD) panels, Direct View Light Emitting Diode (LED) arrays, blended projection screens, Laser Phosphor Displays and rear projection cubes. Client devices 106a-106c can be used in any private or public venue, such as a retail store. Client devices 106a-106c can be driven by video cards or video processors designed to manage and drive one or more display screens.

As shown in FIG. 1, media rendering computers 102 can be located remotely and send full-frame, full-duration rendered master media files to client devices 106a-106c over network 108. The master media files can be encoded using any desired codec. The media files can be packetized and sent over network 108 to client devices 106a-106c using known communication protocols (e.g., TCP/IP and HTTP).

Network 108 can be a wired or wireless local area network (LAN) (e.g., a Wi-Fi network) or a wired or wireless wide area network (WAN) (e.g., the Internet). Network 108 can include subnetworks, public networks, optical networks, private networks having any of a number of configurations.

In an example use scenario, a video producer can create a master media composition on a media editing computer 104 using, for example, a video editing application (e.g., Final Cut Pro®, Premier Pro®, Media Composer®, Cinema 4D®, After Effects®, Blender™). The video editing application can create a master media file that is sent by the media editing computer 104 through network 108 to media rendering computers 102, which can be operated by a media rendering service provider. In an embodiment, the master media file is uploaded to a website operated by the media rendering service provider. In an embodiment, the master media file is sent by the video editing application using an Application Programming Interface (API) or other suitable interface for transferring master media files to media rendering computers 102.

In an embodiment, a master media file can be sent to media rendering computers 102 in a multimedia container file. The multimedia container file can contain a sequence of frames of a master media composition and each frame can include one or more media assets including but not limited to: video objects, digital images, graphics objects, text objects, audio objects, animation and effects (e.g., motion graphics). The media assets can be stored in any format, such as Moving Picture Experts Group (MPEG-2, MPEG-4), Joint Photographic Experts Group (JPEG), Windows Media 12, Audio Video Interleave (AVI), QuickTime Movie Format, etc., and can have any resolution or signal format (e.g., NSTC, PAL, SECAM). The multimedia container file may also include metadata for use in rendering frames, including flattening data and layout data for placing the media assets in the frame, overlay layers, camera viewpoints, textures, lighting, shadows, reflections, and shading.

When a master media file is first received by media rendering computers 102, the master media file is processed through three stages. For example, the master media file could be a motion graphics video. A motion graphics video is a video file that includes any combination of media assets, such as text, images, video, shapes, and/or other digital media, that are layered together into a single master composition, much like someone might layer newspaper articles, photos and personal art onto a scrapbook page.

In a first stage, the master media file is parsed into its component media assets which are individually rendered into files and archived. In a second state, the total duration of the master media file is divided into segments of frames (e.g., 30 frames/segment) which are individually rendered into files with their dependent media asset files and archived. In a third stage, the segments are time-ordered and combined (e.g., concatenated) into a rendered full-frame, full-duration master media file.

When an update to the master media file is received by media rendering computers 102, media rendering computers 102 determine if any component media assets of the master media file have been updated, added or deleted. Any new component media assets that are not found in the archive are rendered and archived. Media rendering computers 102 then determine which archived segment files have frames with dependencies on the media assets and renders those segment files again with the new, updated or deleted media assets. Media rendering computers 102 then combine all of the rendered segment files into a time-ordered, full-frame, full-duration master media file, which can be distributed to one or more client devices 106a-106c using, for example, a media distribution server computer.

By breaking the rendering process into three stages as described above, previously rendered and archived media asset files and segment files can be reused when needed. Also system 100 becomes more scalable and robust by loosening the dependence on high performance rendering nodes and allowing some segment files to render to completion even if a rendering node becomes inoperable.

FIG. 2 illustrates a DMR parallel processing system 200, according to an embodiment. DMR parallel processing system 200 can be distributed across a plurality of media rendering computers 102 in, for example, a server farm operated by a media rendering service. In the example embodiment shown, system 200 shown includes system manager 202, distribution manager 204, flattening system 206 and production system 208. Flattening system 206 further includes flattening system task manager 210, render engine 214 and archive 216. Production system 208 further includes production system task manager 212, stitching engine 218, combining engine 220 and encoding engine 222.

In an example embodiment, system manager 202 receives a rendering request 202 from a media editing application running on media editing computer 104. The request can include, or provide a reference to (e.g., a uniform resource locator (URL)), a master media file to be rendered, such as a motion graphics video file. The request can be received by media rendering computer 102 during a network session established with media editing computer 104.

In an example user scenario, system manager 202 sends flattening data to flattening system task manager 210. Some examples of flattening data include but are not limited to: a text string and associated tweening data to transform opacity from 100% to opaque to 0% opaque over a specified time, an image and associated tweening data to transform the scale of the image from 100% size to 150% size over a specified time, and a shape and associated tweening data to skew or otherwise transform vertices from one set of spatial positions to another set of special positions over time. In an embodiment, tweening data can be used to generate intermediate frames between two images to give the appearance that the first image evolves smoothly into the second image. In an embodiment, a media editing application running on media editing computer 104 allows a user to identify specific objects in an image and define how they should move and change during a tweening process. The result of this tweening process is the tweening data which can be included in the master media file or multimedia container file sent to media rendering computers 102.

Task manager 210 assigns and manages tasks for rendering component media assets and segments, then indexing and storing the rendered media asset files and segment files in archive 216, which can include one or more storage devices. To retrieve a rendered media asset file or segment file from archive 216, the index can be queried using, for example, a hash map/table stored in archive 216. In an embodiment, metadata can be stored with media asset files or in separately indexed file or database table. The metadata can include information on frame dependencies and placement of component media assets in frames.

System manager 202 also provides layout data to production system task manager 212 in production system 208. Layout data can include coordinate position data for each media asset in every frame. For example, Asset A has position $(X_1, Y_1)$ in frame 1, Asset A has position $(X_2, Y_2)$ in frame 2, Asset B has position $(X_2, Y_2)$ in frame 2, etc. Layout data can also describe complex relationships between asset position and frame count. For example, Asset B has a starting position $(X_S, Y_S)$ in frame $N_S$, the change in its coordinate position in each successive frame can be described by formula Z until frame $N_E$, so $(X_S, Y_S)$, $N_S$, $N_E$, and Z is stored in a database and later used to replay the motion of Asset B from Frame $N_S$ to Frame $N_E$, or use formula Z with new X, Y, $N_S$, and/or $N_E$ values dynamically. Layout data can also be based on flattening data that the media assets themselves may transform over time. Information can be stored about when to freeze an asset's transformation, for how long, or for what direction and/or speed to play an asset's transformation relative to the progression of overall frames of the media file.

Task manager 212 assigns and manages tasks for stitching rendered component media asset files into rendered full-frame segment files, combining the rendered full-frame segment files into a rendered full-frame, full-duration master media file and encoding the rendered full-frame, full-duration master media file for distribution to client devices 106, or to media editing computers 104 for further editing. Stitching engine 218 is configured to stitch component media asset files into a plurality of full-frame segment files each having a specified duration (e.g., 3 seconds). Stitching engine 218 can use the layout data received from system manager 202 to place the component media assets at the proper positions and orientations in the frames. The rendered segment files output by stitching engine 218 are essentially short video clips that can be played by a media player and can be stored in, for example, QuickTime Media Format.

The media assets will have certain properties inherent to them including, but not limited to: opacity, size, placement in frame, duration, movement, etc. Some of these properties are described by layout data and some are described by flattening data. Some data points may change later and other data points may stay the same. Stitching engine 218 uses at a minimum, the layout data from system manager 202 combined with the archived files in archive 216, and optionally uses the flattening data from task manager 210 and/or additional logic from task manager 212, to construct full frames of media for combining engine 220.

Combining engine 220 is configured to combine the rendered full-frame video segment files into a full-frame, full-duration master media file. Encoding engine 222 encodes the full-frame, full-duration master media file using one or more codecs (e.g., MPEG4 codec). In some embodiments, the encoding engine 222 compresses and/or encrypts the rendered full-frame, full-duration master media file. The rendered full-frame, full-duration master media file is sent to distribution manager 204, which manages the distribution of the rendered full-frame, full-duration master media file to one or more client devices 106. For example, the entire master media file can be sent to client devices 106 or streamed as part of a streaming service in response to requests from client devices 106.

Example DMR Processes

FIGS. 3A-3D illustrate rendering a new master media file using the DMR system 100, according to an embodiment. In the examples that follow, some of the rendered media assets and the segments are shown as having QuickTime® Movie Format extensions. In practice, however, any suitable format can be used. The QuickTime® Movie Format specifies a multimedia container file that contains one or more tracks, each of which stores a particular type of data: audio, video, or text. Each track either contains a digitally-encoded media stream (using a specific format) or a data reference to the media stream located in another file. Tracks are maintained in a hierarchical data structure consisting of objects called atoms. An atom can be a parent to other atoms or it can contain media data or edit data. The format contains abstract data references for the media data, and the separation of the media data from the media offsets and track edit lists.

Figure 3A:
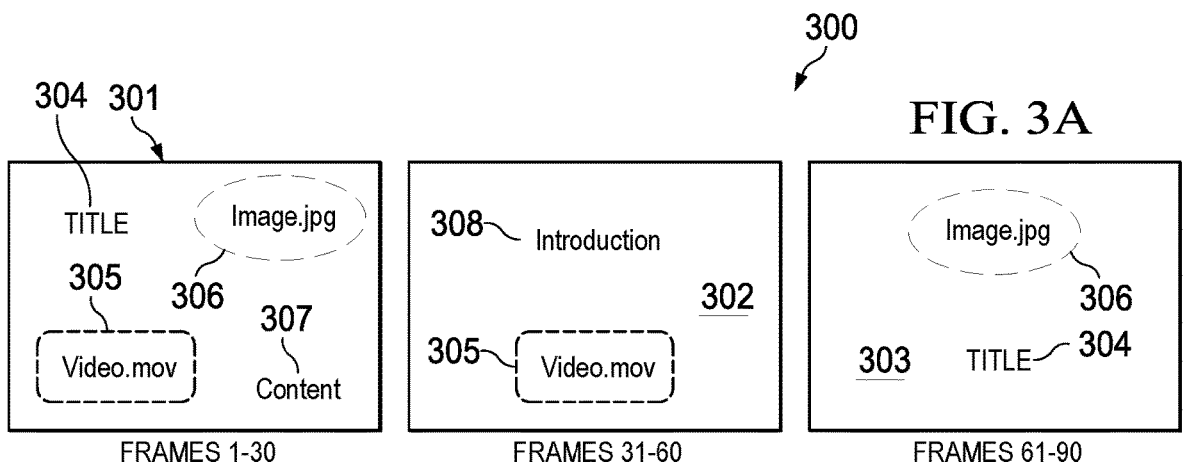
FIGS. 3A-3D illustrate rendering a new master media file using the DMR system, according to an embodiment.

Referring to FIG. 3A, an example master media file 300 is shown. Master media file 300 includes 90 frames, which are subdivided into segments 301, 302, 303. A first segment 301 (frames 1-30) includes media assets 304 (TITLE), 305 (Video.mov), 306 (Image.jpg) and 307 (content). A second segment 302 (frames 31-60) includes media asset 308 (Introduction) and media asset 305 (Video.mov). A third segment 303 (frames 61-90) includes media asset 304 (TITLE) and media asset 306 (Image.jpg). Media asset 304 (TITLE) is included in the first and third segments 301, 303, but not in the second segment 302. Media asset 305 (Video.mov) is included in the first and second segments 301, 302, but not in the third segment 303. Media asset 306 (Image.jpg) is included in the first and third segments 301, 303, but not in the second segment 302. Media asset 307 (content) is included only in the first segment 301. Media asset 308 (Introduction) is only included in the second segment 302.

Figure 3B:
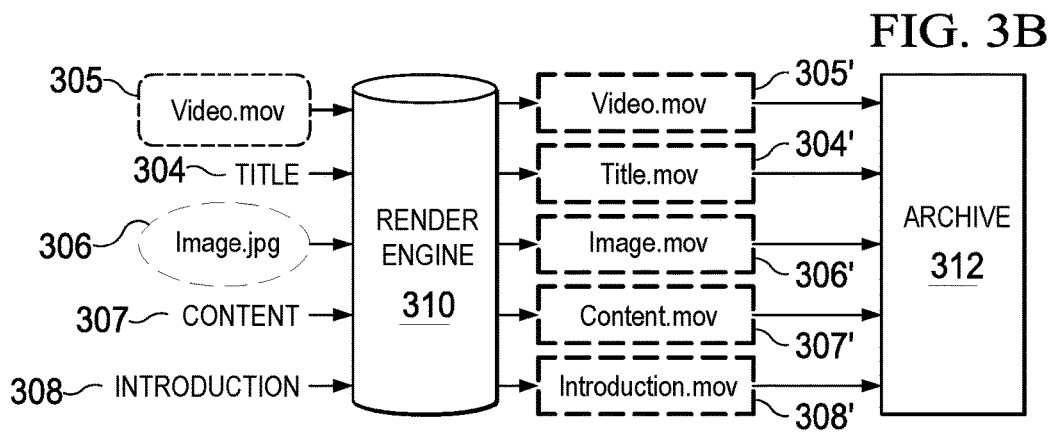

Referring to FIG. 3B, in a first stage, render engine 310 takes as inputs media assets 304-308 and outputs rendered media asset files 304', 305', 306', 307', 308' (Video.mov, Title.mov, Image.mov, Content.mov, Introduction.mov). After rendering, media asset files 304'-308' are stored in archive 312.

Figure 3C:
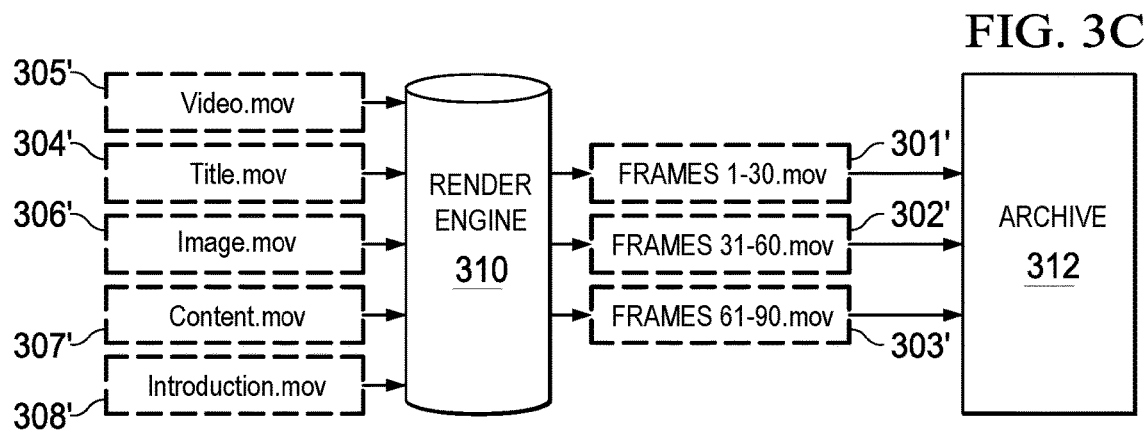

Referring to FIG. 3C, in a second stage, master media file 300 is divided into 3 segment files of frames each having a specified duration (e.g., 1-3 seconds). Each segment file can have the same number of frames or a different number of frames. Each segment file includes sequential, full-frames of master media file 300 for the specified duration. Render engine 310 renders the 3 segments into segment files 301', 302', 303' (Frames 1-30.mov, Frames 31-60.mov and Frames 61-90.mov). After rendering, the segment files 301'-303' are stored in archive 312. The segment files 301'-303' can be stored in the same archive 312 as the rendered media assets or in a different archive. Each segment file 301'-303' is essentially a video clip of sequential, full-frames of the master media file that can be played on a media player. In the example, shown the component media asset files and the segment files are stored in QuickTime® Movie Format (.mov extension). During the second stage, the placement of the individually rendered media assets 304-308 in their respective dependent frames (e.g., x, y position or offset) can be based on layout data received in connection with the media rendering request from the client device. In an embodiment, the layout data is part of metadata included in a multimedia container file sent by the media editing computers 104.

Figure 3D:
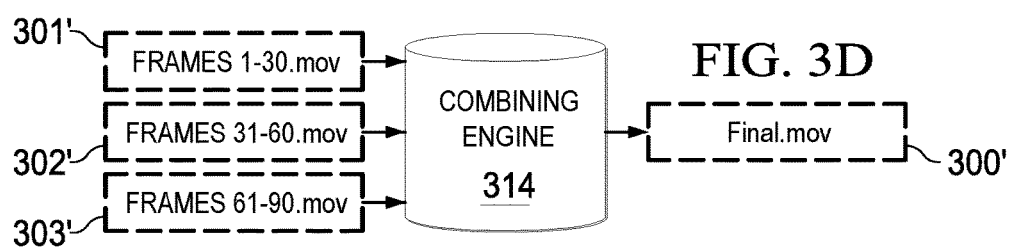

Referring to FIG. 3D, in a third stage, combining engine 314 combines together the three rendered segment files 301'-303', in time order, to create a full-frame, full-duration rendered master media file 300' (Final.mov), which can then be distributed to one or more client devices 106a-106c.

Figure 4A:
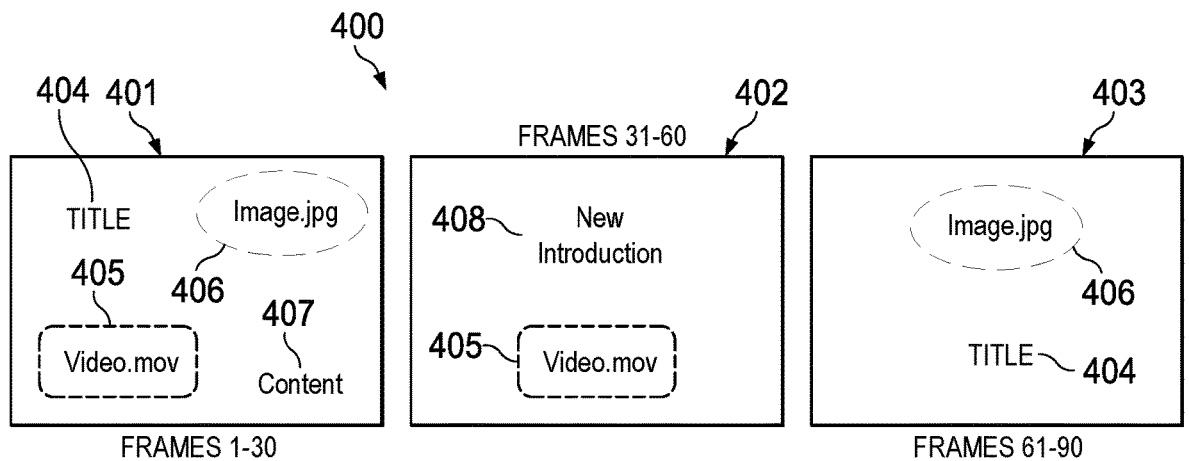
FIGS. 4A-4D illustrate updating a previously rendered master media file using the DMR system, according to an embodiment.

FIGS. 4A-4D illustrate updating a previously rendered master media file using the DMR system 100, according to an embodiment. Referring to FIG. 4A, an example master media file 400 is shown. Master media file 400 includes 90 frames, which are subdivided into segments 401, 402, 403. Segment 401 of master media file 400 (frames 1-30) includes media assets 404 (TITLE), 405 (Video.mov), 406 (Image.jpg) and 407 (content). Segment 402 of master media file 400 (frames 31-60) includes media assets 408 (New Introduction) and 405 (Video.mov). Segment 403 of master media file (frames 61-90) includes media assets 406 (Image.jpg) and 404 (TITLE). Media asset 404 (TITLE) is included in the first and third segments 401, 403, but not in the second segment 402. Media asset 406 (Image.jpg) is included in the first and third segments 401, 403, but not in the second segment 402. Media asset 405 (Video.mov) is included in the first and second segments 401, 402, but not in the third segment 403. Media asset 407 (content) is included only in the first segment 401. Media asset 408 (New Introduction) is only included in the second segment 402.

Figure 4B:
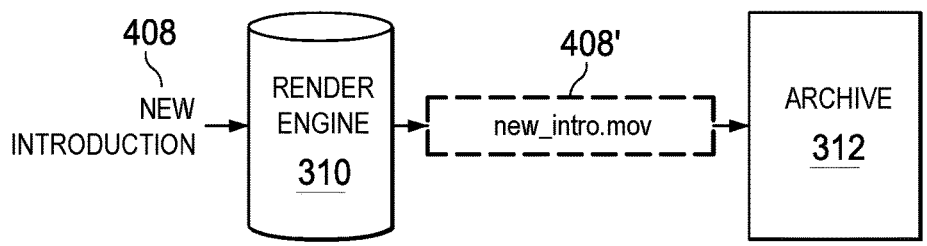

Referring to FIG. 4B, in a first stage, render engine 310 takes as input new component media asset 408 (New Introduction), outputs rendered component media asset file 408' (new_intro.mov) and stores the rendered media asset file 408' in archive 312.

Figure 4C:
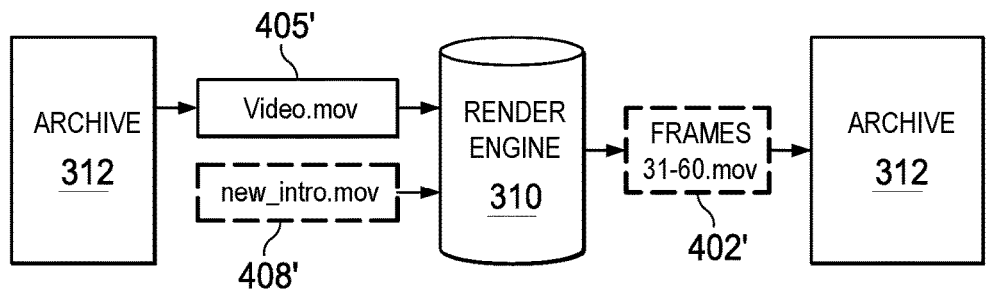

Referring to FIG. 4C, in a second stage, render engine 310 renders the newly rendered and archived media asset file 408' (New_Intro.mov) with any previously archived rendered media assets that are included in the same segment. In the example shown, component media asset 408 was included only in the second segment 402 (frames 31-60). The only other component media asset included in the second segment 402 is component media asset 405. Accordingly, only the second segment 402 is rendered again to include the rendered component media asset file 408' (New_Intro.mov) and component media asset file 405' (Video.mov) retrieved from archive 312. The output of render engine 310 is the re-rendered second segment file 402' (Frames 31-60.mov). The placement (e.g., x, y position or offset) of rendered media asset 408 (New_Intro.mov) in dependent frames of the second segment file 402' (Frames 31-60.mov) can be based on layout data received in connection with a media rendering request from media editing computers 104.

Figure 4D:
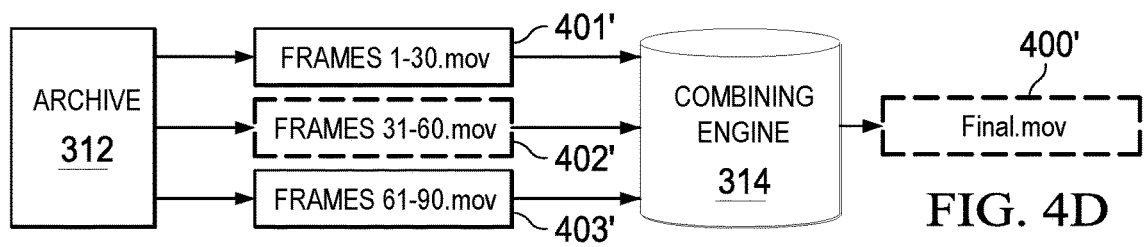

Referring to FIG. 4D, in a third stage, combining engine 414 combines together all three segment files 401', 402', 403', in time order, to create a full-frame, full-duration rendered master media file 400' (Final.mov), which can then be distributed to one or more client devices 106a-106c.

FIGS. 5A-5D illustrate rendering a new media file using only archived media assets and segments, according to an embodiment. Referring to FIG. 5A, master media file 500 is shown. Master media file 500 includes 90 frames, which are subdivided into segments 501, 502, 503. Segment 501 (frames 1-30) includes media asset 505 (Video.mov). Segment 502 (frames 31-60) includes media asset 504 (TITLE). Segment 503 (frames 61-90) includes media assets 504 (TITLE), 506 (Image.jpg) and 507 (Introduction). Media asset 505 (Video.mov) is only included in the first segment 501. Media asset 506 (Image.jpg) is only included in the third segment 503. Media assets 504 (TITLE), 506 (Image.jpg), 507 (Introduction) are included in the third segment 503, but not in segments 501, 502. Media asset 507 (Introduction) is only included in the third segment 503.

Referring to FIG. 5B, in a first stage, there are no new or media assets to render. The DMR process moves to the second stage. Referring to FIG. 5C, in the second stage, render engine 310 takes as inputs the individually rendered component media asset files 504'-507' from archive 312 and renders again the 3 segment files 501'-503' (Frames 1-30.mov, Frames 31-60.mov, Frames 61-90.mov), all three of which are dependent on the component media asset files 504'-507'.

Referring to FIG. 5D, in a third stage, combining engine 314 combines together all three segment files 501', 502', 503', in time order, to create a full-frame, full-duration rendered master media file 500' (Final.mov), which can then be distributed to one or more client devices 106a-106c.

Figure 6:
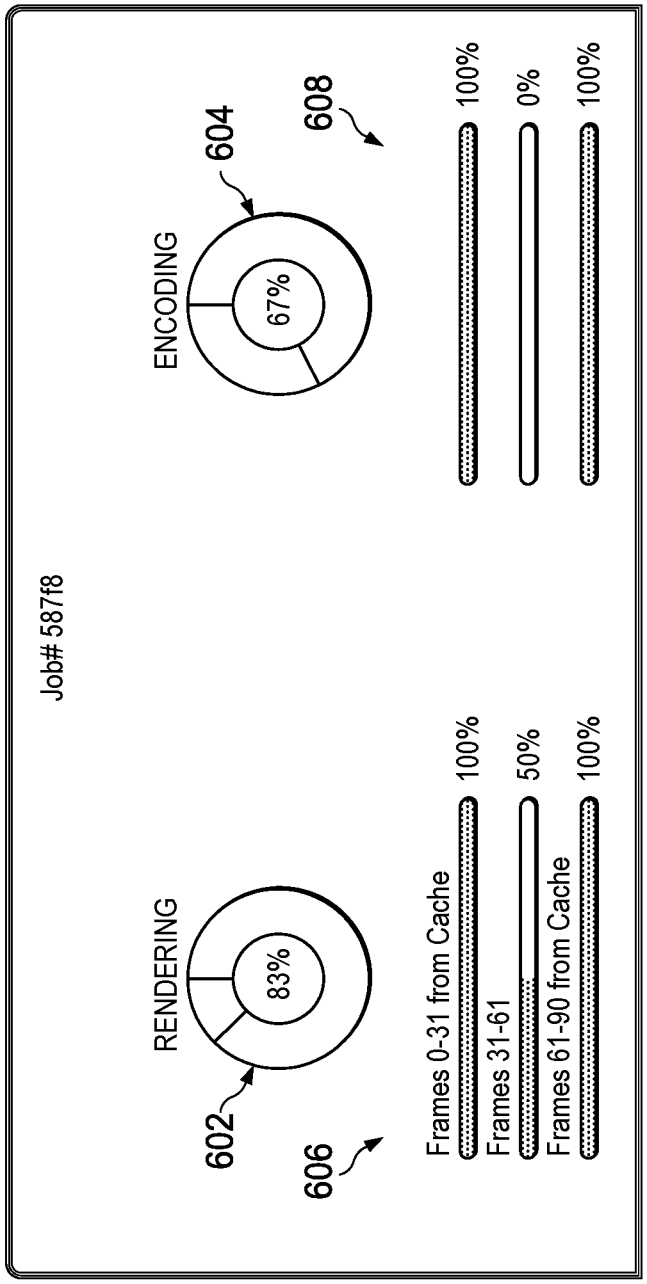
FIG. 6 illustrates the DMR rendering process shown in FIGS. 4A-4D, according to an embodiment.

FIG. 6 illustrates the DMR rendering process shown in FIGS. 4A-4D performed by the parallel processing system 200 of FIG. 2, according to an embodiment.

In this example, a Job #587f8 was initiated by, for example, system manager 202 (FIG. 2) in response to a rendering request from media editing computer 104 to render master media file 400 (e.g., a motion graphics video). System manager 202 hashes an index map/table stored in archive 216 to determine if any of the component media assets 404-408 included in master media file 400 have been previously stored in archive 312. In this example, system manager 202 determines that media asset files 404'-407' are stored in archive 312 and media asset 408 is not stored in archive 312. System manager 202 then hashes the hash map/table for the archived segments and determines that the new media asset 408 is only included in the second segment file 402' (frames 31-60). System manager 202 then provides flattening data for media asset 408 to flattening system task manager 210. Flattening system task manager 210 instructs render engine 214 to render media asset 408, store rendered media asset file 408' in archive 216 and update the hash map/table.

Next system manager 202 determines which archived segments include the newly rendered asset 408 by hashing the hash map/table stored in archive 216. System manager 202 determines that media asset 408 is included only in the second segment file 402' (Frames 31-60.mov). System manager 202 then sends layout data to production task manager 212. Production task manager 212 instructs stitching engine 218 to add the media asset to the second segment file 402'. Production task manager 212 then instructs combining engine 220 to combine (e.g., concatenate) together all three segment files 401', 402', 403', in time order, to create a full-frame, full-duration master media file. Production task manager 212 then instructs encoding engine 222 to encode the master media file 400' and send the encoded master media file to distribution manager 204 for distribution to client devices 106a-106c.

Because system 200 is a parallel processing system, the various tasks can be performed in parallel on different media rendering nodes (e.g., different rendering computers 102). Various tasks may have to wait for dependencies to be resolved. For example, as illustrated with the task progress bars 602, 604, 606, 608 shown in FIG. 6, the unaffected first and third segment files 401', 403' were archived and their task progress bars show 100% completion for the rendering and encoding tasks. Since the first and third segment files are unaffected, the first and third segment files can be retrieved from archive 216. The progress bar for the second segment 402' shows 50% completion for the rendering task. Once the rendering task for the second segment file 402' is 100% complete, encoding engine 222 can begin encoding the second segment file 402'.

FIG. 7 is a flow diagram of a DMR process 700 for rendering new master media files, according to an embodiment. Process 700 can be performed by the server computer architecture 900, as described in reference to FIG. 9.

Process 700 can begin by parsing component media assets from a master media file (702), individually rendering (704) the component media assets, and archiving (706) the rendered media assets in an archive for reuse. Process 700 can continue by rendering segment files of full-frames of the master media file (708), and archiving (710) the rendered segment files for reuse. Process 700 can continue by combining in time order the rendered segment files into a full-frame, full-duration master media file (712).

FIG. 8 is a flow diagram of a DMR process 800 for updating master media files, according to an embodiment. Process 800 can be performed by the server computer architecture 900, as described in reference to FIG. 9.

Process 800 can begin by parsing component media assets from a master media file (802). Process 800 can continue by determining if any of the component media assets are new and have not been previously rendered and archived, and then individually rendering (804) the new component media assets and storing (806) the rendered new component media assets in the archive for reuse. Process 800 can continue by determining dependencies (808) between the archived media assets and previously rendered segment files of full-frames of the master media file, re-rendering and archiving only the segment files with determined dependencies (810). Process 800 can continue by combining in time order the rendered segment files into a full-frame, full-duration rendered master media file (812).

Example Client-Side Application

Media editing applications can utilize DMR to render previews of media files. For example, a frame of a multimedia composition (e.g., motion graphics video) can include multiple layers, where each layer includes one or more media assets. It is desirable for a user to preview the multimedia composition in near real-time during the editing process. Traditionally, previewing a multimedia composition required that the composition be rendered completely before being played, which takes a long time, disrupting the creative work flow of the user. Also, due to the large amount of processing needed for real-time rendering, the preview would often include glitches and other artifacts.

In an embodiment, each layer of the multimedia composition can be rendered using DMR system 100. The rendering can be performed transparently as a background process in response to a trigger event while the user is editing. A trigger event can be when the user saves the project or expiration of a time period (e.g., 1 minute) when no activity by the user is detected (e.g., the user has not made an edits). In an embodiment, the media editing application can have a "freeze" feature that allows the user to "freeze" a layer so that media assets in the layer are rendered and stored in cache. Upon detection of a rendering trigger event, the media assets in the layer are sent to media rendering computers 102 to be rendered and archived. When the user engages the preview feature to preview their multimedia composition, the preview engine in the media editing application can request retrieval of the rendered media assets from the archive that below to the multimedia composition. This allows the preview engine to simply play back the media file without any real-time rendering.

In another embodiment, the rendered media items for the current project are cached locally on the media editing computer or a storage device coupled to the media editing computer. For example, when the user first loads a media project in the media editing application (e.g., Final Cut Pro®, After Effects®), the rendered media assets or segments for the project can be retrieved from a local or remote, network storage device and stored in local cache in memory. By pre-rendering the media assets and storing those media assets in cache, the preview of the composition can be played without a long delay and with less artifacts and glitches.

Example Server Architecture

Figure 9:
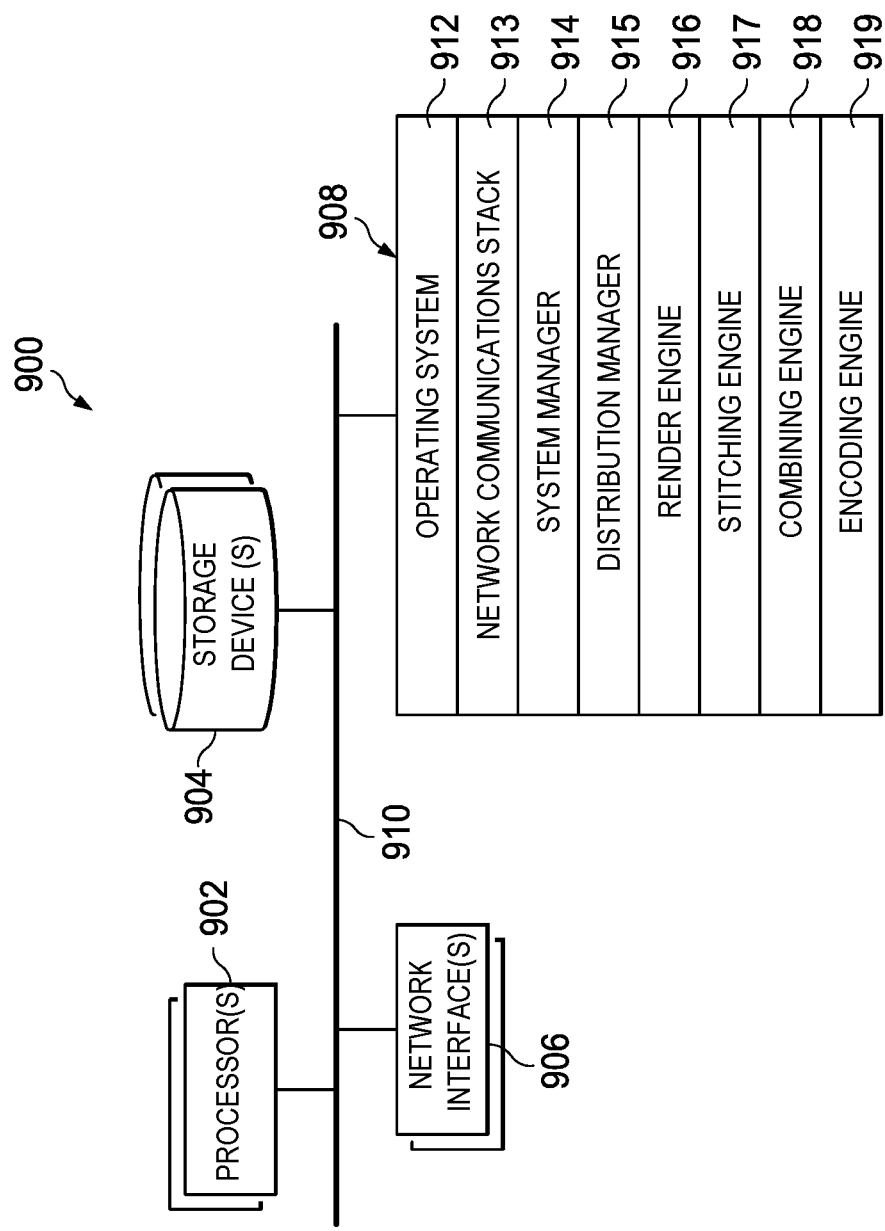
FIG. 9 illustrates server computer architecture, according to an embodiment.

FIG. 9 is a block diagram of example server architecture for implementing the features and processes described in reference to FIGS. 1-8, according to an embodiment. Other architectures are possible, including architectures with more or fewer components. In some implementations, architecture 900 includes one or more processor(s) 902 (e.g., dual-core Intel® Xeon® Processors), one or more network interface(s) 906, one or more storage device(s) 904 (e.g., hard disk, optical disk, flash memory) and one or more computer-readable medium(s) 908 (e.g., hard disk, optical disk, flash memory, etc.). These components can exchange communications and data over one or more communication channel(s) 910 (e.g., buses), which can utilize various hardware and software for facilitating the transfer of data and control signals between components.

The term "computer-readable medium" refers to any storage medium that stores and provides instructions to processor(s) 902 for execution, including without limitation, non-volatile media (e.g., optical or magnetic disks) and volatile media (e.g., memory).

Computer-readable medium(s) 908 can further include computer program instructions for implementing operating system 912 (e.g., Mac OS® server, Windows® NT server), network communication stack 913, system manager 914, distribution manager 915, render engine 916, stitching engine 917, combining engine 918 and encoding engine 919, as described in reference to FIGS. 1-8.

Operating system 912 can be multi-user, multiprocessing, multitasking, multithreading, real time, etc. Operating system 912 performs basic tasks, including but not limited to: recognizing input from and providing output to devices 902, 904, 906 and 908; keeping track and managing files and directories on computer-readable medium(s) 908 (e.g., memory or a storage device); controlling peripheral devices; and managing traffic on the one or more communication channel(s) 910. Network communications stack 913 includes various components for establishing and maintaining network connections (e.g., software for implementing communication protocols, such as TCP/IP, HTTP, etc.). Computer program instructions implementing system manager 914, distribution manager 915, render engine 916, stitching engine 917, combining engine 918 and encoding engine 919 can be any suitable computer language and have one or more functions distributed over multiple server computers in a distributed, parallel architecture, a described in reference to FIG. 2.

Architecture 900 can be included in any computer device, including one or more server computers in a local or distributed network each having one or more processing cores. Architecture 900 can be implemented in a parallel processing or peer-to-peer infrastructure or on a single device with one or more processors. Software can include multiple software components or can be a single body of code.

The features described may be implemented in digital electronic circuitry or in computer hardware, firmware, software, or in combinations of them. The features and processes may be implemented in a computer program product tangibly embodied in an information carrier, e.g., in a machine-readable storage device, for execution by a programmable processor. The features and processes may be implemented in a non-transitory, computer-readable storage medium. Method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an application the capabilities of a device running the application, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   parsing, by one or more media rendering computers, a master media file into component media assets;
   determining, by the one or more media rendering computers, that one or more component media assets have not been previously rendered and stored in an archive;
   individually rendering, by the one or more media rendering computers, the one or more component media assets into rendered media asset files;
   storing, by the one or more media rendering computers, the rendered media asset files in the archive;
   determining, by the one or more media rendering computers, one or more archived segment files having dependencies on the one or more component media assets, each segment file including one or more full-frames of the master media file;
   individually rendering, by the one or more media rendering computers, the one or more segment files having dependencies on the one or more component media assets;
   storing, by the one or more media rendering computers, the rendered segment files; and
   combining, by the one or more media rendering computers, the rendered segment files together with other archived segment files of the master media file to create a full-frame, full-duration master media file.

2. The method of claim 1, wherein the master media file is a motion graphics video.

3. The method of claim 1, further comprising:
   encoding, by the one or more media rendering computers, the full-frame, full-duration master media file; and
   sending, by the one or more media rendering computers, the encoded full-frame, full-duration master media file to a client device.

4. The method of claim 3, wherein the media asset files and segment files are rendered or encoded in parallel using different media rendering computers.

5. A method comprising:
   receiving, by one or more media rendering computers, an updated master media file, the updated master media file including one or more updated, added or deleted component media assets;
   determining, by the one or more media rendering computers, that one or more added component media assets have not been previously rendered and stored in an archive;
   individually rendering, by the one or more media rendering computers, the one or more added component media assets into rendered media asset files;
   storing, by the one or more media rendering computers, the rendered media asset files in the archive;
   determining, by the one or more media rendering computers, one or more archived segment files having dependencies on the one or more component media assets, each segment file including one or more full-frames of the master media file;
   individually rendering, by the one or more media rendering computers, the one or more segment files having dependencies on the one or more component media assets;
   storing, by the one or more media rendering computers, the rendered segment files; and
   combining, by the one or more media rendering computers, the rendered segment files together with other archived segment files of the master media file to create a full-frame, full-duration master media file.

6. The method of claim 5, wherein the master media file is a motion graphics video.

7. The method of claim 5, further comprising:
   encoding, by the one or more media rendering computers, the full-frame, full-duration master media file; and
   sending, by the one or more media rendering computers, the encoded full-frame, full-duration master media file to a client device.

8. The method of claim 5, wherein the component media asset files and segment files are rendered or encoded in parallel using different media rendering computers.

9. A system comprising:
   one or more processors;
   memory coupled to the one or more processors and configured for storing instructions, which, when executed by the one or more processors, causes the one or more processors to perform operations comprising:

parsing a master media file into component media assets;
determining that one or more component media assets have not been previously rendered and stored in an archive;
individually rendering the one or more component media assets into rendered media asset files;
storing the rendered media asset files in the archive;
determining one or more archived segment files having dependencies on the one or more component media assets, each segment file including one or more full-frames of the master media file;
individually rendering the one or more segment files having dependencies on the one or more component media assets;
storing the rendered segment files; and
combining the rendered segment files together with other archived segment files of the master media file to create a full-frame, full-duration master media file.

10. The system of claim 9, wherein the master media file is a motion graphics video.

11. The system of claim 9, further comprising:
encoding, by the one or more media rendering computers, the full-frame, full-duration master media file; and
sending, by the one or more media rendering computers, the encoded full-frame, full-duration master media file to a client device.

12. The system of claim 11, wherein the media asset files and segment files are rendered or encoded in parallel using different media rendering computers.

13. A non-transitory, computer-readable storage medium having instructions stored thereon, which, when executed by one or more processors, causes the one or more processors to perform operations comprising:
parsing a master media file into component media assets;
determining that one or more component media assets have not been previously rendered and stored in an archive;
individually rendering the one or more component media assets into rendered media asset files;
storing the rendered media asset files in the archive;
determining one or more archived segment files having dependencies on the one or more component media assets, each segment file including one or more full-frames of the master media file;
individually rendering the one or more segment files having dependencies on the one or more component media assets;
storing the rendered segment files; and
combining the rendered segment files together with other archived segment files of the master media file to create a full-frame, full-duration master media file.

14. The non-transitory, computer-readable storage medium of claim 13, wherein the master media file is a motion graphics video.

15. The non-transitory, computer-readable storage medium of claim 13, further comprising:
encoding, by the one or more media rendering computers, the full-frame, full-duration master media file; and
sending, by the one or more media rendering computers, the encoded full-frame, full-duration master media file to a client device.

16. The non-transitory, computer-readable storage medium of claim 15, wherein the media asset files and segment files are rendered or encoded in parallel using different media rendering computers.

* * * * *